(12) United States Patent
Park et al.

(10) Patent No.: US 8,588,248 B2
(45) Date of Patent: Nov. 19, 2013

(54) PACKET ROUTING APPARATUS AND METHOD

(75) Inventors: Tae Rim Park, Seoul (KR); Tae Seok Kim, Hwaseong-si (KR); Jong Ae Park, Yongin-si (KR); Yoon Chae Cheong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 13/152,087

(22) Filed: Jun. 2, 2011

(65) Prior Publication Data

US 2012/0087297 A1   Apr. 12, 2012

(30) Foreign Application Priority Data

Oct. 8, 2010   (KR) .................. 10-2010-0098287

(51) Int. Cl.
*H04L 12/43*   (2006.01)
*H04J 3/02*    (2006.01)

(52) U.S. Cl.
USPC ........................................ 370/461; 370/462

(58) Field of Classification Search
USPC .................................................. 370/461–462
See application file for complete search history.

(56) References Cited

U.S. PATENT DOCUMENTS

| | | | |
|---|---|---|---|
| 7,266,085 B2 * | 9/2007 | Stine .............................. | 370/252 |
| 7,647,078 B2 | 1/2010 | Kim et al. | |
| 7,653,003 B2 * | 1/2010 | Stine .............................. | 370/252 |
| 7,783,300 B2 * | 8/2010 | Sinha ......................... | 455/456.1 |
| 7,970,013 B2 * | 6/2011 | Sinha et al. ................... | 370/470 |
| 2006/0140166 A1 | 6/2006 | Albulet | |
| 2007/0248089 A1 * | 10/2007 | Redi et al. .................... | 370/392 |
| 2008/0119130 A1 * | 5/2008 | Sinha ............................... | 455/1 |
| 2008/0144493 A1 * | 6/2008 | Yeh ............................. | 370/230 |
| 2008/0151762 A1 | 6/2008 | Armstrong et al. | |
| 2010/0074161 A1 * | 3/2010 | Munari et al. ............... | 370/315 |
| 2012/0051251 A1 * | 3/2012 | Seo et al. ..................... | 370/252 |
| 2012/0063435 A1 * | 3/2012 | Sugaya et al. ............... | 370/338 |

FOREIGN PATENT DOCUMENTS

| | | |
|---|---|---|
| JP | 2008-204136 | 9/2008 |
| KR | 10-2005-0108533 | 11/2005 |
| KR | 10-2006-0085408 | 7/2006 |
| KR | 10-2009-0099636 | 9/2009 |
| KR | 10-2010-0056745 | 5/2010 |

\* cited by examiner

*Primary Examiner* — Chuong T Ho
(74) *Attorney, Agent, or Firm* — NSIP Law (57) ABSTRACT

A packet routing apparatus and method are provided. The packet routing apparatus may participate in a sensor network. In certain aspects the packet routing apparatus may snatch a request to send (RTS) signal that is transmitted from a first node to a second node in the sensor network and may intervene on the relay path of the snatched data packet. In certain aspects, the packet routing apparatus may sniff a data packet that is transmitted from a first node to a second node and may intervene on the relay path of the sniffed data packet.

8 Claims, 7 Drawing Sheets

PACKET ROUTING APPARATUS AND METHOD

CROSS-REFERENCE TO RELATED APPLICATION(S)

This application claims the benefit under 35 U.S.C. §119 (a) of Korean Patent Application No. 10-2010-0098287, filed on Oct. 8, 2010, in the Korean Intellectual Property Office, the entire disclosure of which is incorporated herein by reference.

BACKGROUND

1. Field

The following description relates to a packet routing apparatus and method for reducing power consumption and packet transmission delay in a sensor network, and more particularly, to a packet routing apparatus and method that may intervene on a relay transmission path of a data packet.

2. Description of Related Art

A sensor network may include a home sensor network, a structure monitoring network, a healthcare network, and the like. The sensor network may include one or more nodes that are operated by batteries for costs and convenience of installation.

Accordingly, a large number of methods for low-power communication in a sensor network have been designed. For example, a synchronous medium access control (MAC), an asynchronous MAC, and the like, have been proposed to perform idle listening in nodes at regular wakeup intervals.

The synchronous MAC may include, for example, an Institute of Electrical and Electronics Engineers (IEEE) 802.11 Adhoc, a S-MAC, and the like. Among the asynchronous MAC, a transmitter oriented asynchronous MAC may include, for example, a B-MAC, an X-MAC, and the like, and a receiver oriented asynchronous MAC may include, for example, a receiver-initiated MAC (RI-MAC), and the like.

In a sensor network, a data packet to be relayed is typically small in size, and the sensor network is sensitive to power consumption that is caused by idle listening. The idle listening also causes a transmission delay because often a relay node may be in a sleep state while a node is attempting to transmit a data packet to the node in the sleep state. This waiting can cause a delay in transmission time.

SUMMARY

In one general aspect, there is provided a packet routing apparatus, including a transceiver to receive a request to send (RTS) signal that is transmitted from a first node to a second node included in a network, and a controller to generate a clear to send (CTS) signal that is in response to the received RTS signal, and to control the transceiver to transmit the CTS signal to the first node.

The packet routing apparatus may further comprise a determining unit to determine whether a data packet associated with the received RTS signal is routable from the packet routing apparatus to a destination node of the data packet, wherein, in response to the data packet being determined to be routable from the packet routing apparatus to the destination node, the controller generates the CTS signal in response to the RTS signal, and controls the transceiver to transmit the CTS signal to the first node.

The transceiver may receive a data packet that is associated with the RTS signal from the first node, and relay the data packet to a third node included in the network.

The network may be a multi-hop sensor network, and the second node may be a relay node to receive data of the first node and to relay the received data.

The packet routing apparatus may be a mobile node that temporarily participates in the network, and the packet routing apparatus may further comprise a determining unit to determine whether the packet routing apparatus is able to stably participate in the network, based on a mobility pattern of the packet routing apparatus, wherein, in response to the packet routing apparatus being determined to be able to stably participate, the controller performs network path resetting so that the packet routing apparatus is included in the network.

In another aspect, there is provided a packet routing apparatus, including a transceiver to receive a data packet that is transmitted from a first node to a second node included in a network, a determining unit to determine whether the data packet is routable from a packet routing apparatus to a destination node, and a controller to transmit a relay permission request for the data packet to the second node, in response to determining that the data packet is routable from the packet routing apparatus to the destination node.

In response to receiving a relay approval from the second node, the controller may control the transceiver to relay the data packet to a third node in a routing path from the packet routing apparatus to the destination node.

In another aspect, there is provided a packet routing method, including receiving a request to send (RTS) signal that is transmitted from a first node to a second node included in a network, determining whether a data packet associated with the received RTS signal is routable from a packet routing apparatus to a destination node of the data packet, generating a clear to send (CTS) signal in response to the RTS signal, in response to determining the data packet is routable from the packet routing apparatus to the destination node, and transmitting the CTS signal to the first node.

The packet routing method may further comprise receiving the data packet from the first node, and relaying the data packet to a third node included in the network.

The network may be a multi-hop sensor network, and the second node may be a relay node to receive data of the first node in the network and to relay the received data.

The method is performed in a mobile node that temporarily participates in the network, and the method may further comprise determining whether the mobile node is able to stably participate in the network, based on a mobility pattern of the mobile node, and performing network path resetting so that the mobile node is included in the network, in response to determining that the mobile node is able to stably participate.

In another aspect, there is provided a packet routing method of a packet routing apparatus, the packet routing method including receiving a data packet that is transmitted from a first node to a second node included in a network, determining whether the data packet is routable from a packet routing apparatus to a destination node of the data packet, and transmitting a relay permission request for the data packet to the second node, in response to determining that the data packet is routable from the packet routing apparatus to the destination node.

The network may be a multi-hop sensor network, and the second node may be a relay node to receive data of the first node and to relay the received data. The method may be performed in a mobile node that temporarily participates in the network, and the method may further comprise relaying the data packet to a third node in a routing path from the mobile node to the destination node, in response to receiving a relay approval from the second node.

In another aspect, there is provided a computer-readable storage medium storing program instructions to cause a processor to implement a method including receiving a request to send (RTS) signal that is transmitted from a first node to a second node included in a network, determining whether a data packet associated with the received RTS signal is routable from a packet routing apparatus to a destination node of the data packet, generating a clear to send (CTS) signal in response to the RTS signal, in response to determining the data packet is routable from the packet routing apparatus to the destination node, and transmitting the CTS signal to the first node.

In another aspect, there is provided a packet routing apparatus in a sensor network that includes a path of nodes on which a data packet is sent, the packet routing apparatus including a transceiver to receive a signal that is transmitted from a node on the path to a first subsequent node on the path, and a determiner to determine that the packet routing apparatus can reduce the number of relays on the path of nodes by intervening in the routing of the data packet, wherein the transceiver transmits a message to the node on the path or to the first subsequent node on the path, and the message indicates that the packet routing apparatus is intervening on the transmission of the data packet.

The transceiver may transmit the message to the node on the path, the transceiver may receive the data packet from the node on the path, the transceiver may transmit the data packet to a second subsequent node on the path, and the second subsequent node on the path may be subsequent on the path of nodes than the first subsequent node on the path.

The transceiver may receive the data packet along with the signal transmitted from the node on the path to the first subsequent node on the path, the transceiver may transmit a message to the first subsequent node on the path indicating that the packet routing apparatus is intervening on the transmission of the data packet, the transceiver may transmit the data packet to a second subsequent node on the path, and the second subsequent node on the path may be subsequent on the path of nodes than the first subsequent node on the path. The transceiver may receive a request to send (RTS) frame included in the signal that is transmitted from the node on the path to the first subsequent node on the path, the determiner may determine to snatch the data packet before the data packet is sent to the first subsequent node, and the transceiver may transmit a clear to send (CTS) message to the node on the path indicating that the packet routing apparatus is intervening on the transmission of the data packet.

The transceiver may receive the data packet included in the signal transmitted from the node on the path to the first subsequent node on the path, the determiner may determine to sniff the data packet after the data packet has been sent to the first subsequent node on the path, and the transceiver may transmit a message to the first subsequent node on the path indicating that the packet routing apparatus is intervening on the transmission of the data packet.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

Figure 1:
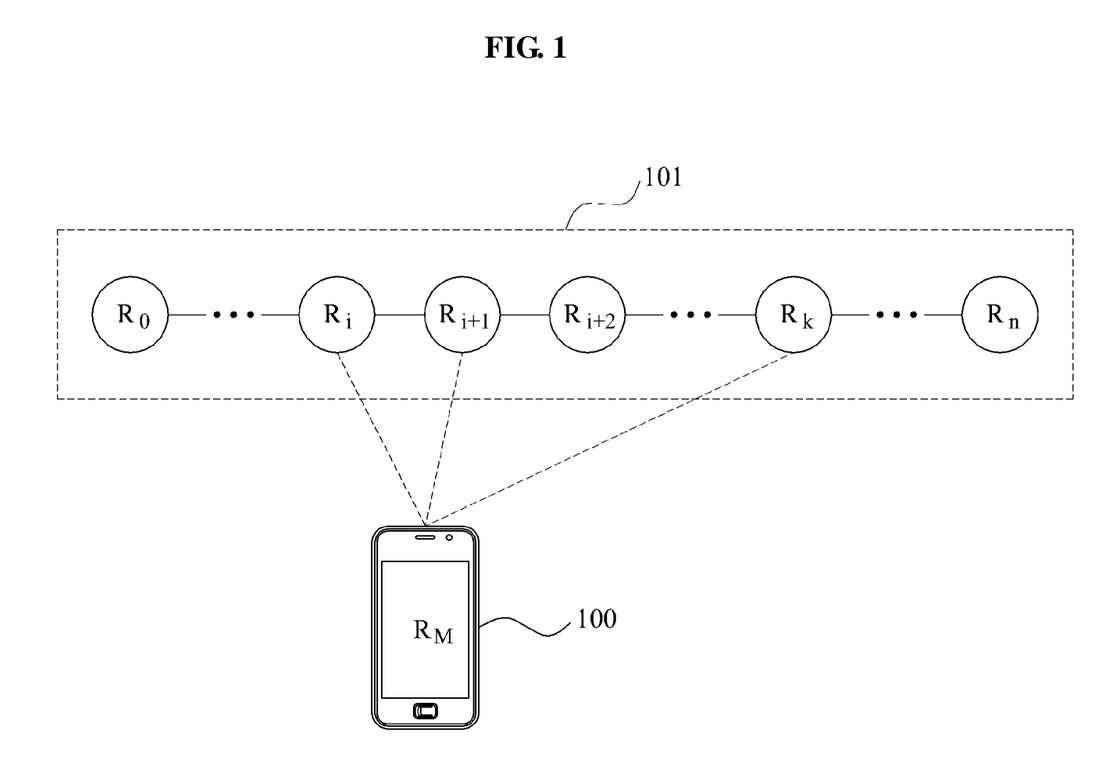
FIG. 1 is a diagram illustrating an example in which a packet routing apparatus is connected to a sensor network.

FIG. 1 illustrates an example in which a packet routing apparatus is connected to a sensor network.

Referring to FIG. 1, the sensor network 101 includes a plurality of nodes, for example, nodes $R_0$, $R_i$, $R_{i+1}$, $R_{i+2}$, $R_k$, $R_n$, and the like. The sensor network 101 may be a network that includes a home sensor network, a structure monitoring networks, a healthcare network, and the like.

Each of the plurality of nodes in the sensor network 101 may perform idle listening and may have regular wakeup intervals. The plurality of nodes may be implemented, for example, by a synchronous media access control (MAC), an asynchronous MAC, and the like.

Referring to FIG. 1, a data packet may be transmitted from node $R_0$ to node $R_n$. For example, the data packet may be received and relayed from a node in a front portion of a routing path to a next node in the routing path, from among the nodes that are located between the nodes $R_0$ and $R_n$. In this example, the node $R_0$ corresponds to a source node, and the node $R_n$ corresponds to a destination node.

A routing topology of the sensor network 101 is merely provided as an example, and it should be appreciated that the routing topology is not limited thereto. That is, the routing topology may be a predetermined topology without departing from the various examples described herein, and may not be interpreted to be limited to a particular routing topology.

The packet routing apparatus 100 may be implemented as a mobile terminal, and may participate in the sensor network 101. For example, the packet routing apparatus may be or may be included in a terminal such as a computer, a mobile phone, a smart phone, an access point, an MP3 player, a router, and the like.

Because nodes in a sensor network are typically driven by batteries, the sensor network 101 may be sensitive to power consumption. Accordingly, the nodes may alternate between an active state and a sleep state, in wakeup intervals.

As the data packet is being relayed on the routing path from the node $R_0$ to the node $R_n$ as illustrated in FIG. 1, transmission delays may occur while waiting for nodes to wake up.

Additionally, because "n+1" nodes participate in the relaying of the data packet, total power consumption may be considerable.

However, the packet routing apparatus 100 may be less sensitive to power consumption in comparison to the nodes of the sensor network 101, and may be in the active state for a relatively longer period of time or all the time. Accordingly, the packet routing apparatus 100 may participate in the sensor network 101 instead of at least one node to relay the data packet.

For example, the packet routing apparatus 100 may snatch data that is being relayed from the node $R_i$ to the node $R_{i+1}$, and may relay the data directly to a node that is further along the relay path such as node $R_k$. In this example, the node $R_k$ may have a connection to the packet routing apparatus 100 from among nodes that are located between nodes $R_{i+1}$ and $R_n$.

Accordingly, the nodes between nodes $R_k$ and $R_i$ do not have to relay the data packet, 0thereby reducing power consumption. Additionally, it is possible to reduce a transmission delay of the data packet, thereby increasing a Quality of Service (QoS).

For example, the nodes in the sensor network 101 may transmit or receive a request to send (RTS) signal and a clear to send (CTS) signal, to relay the data packet. The RTS signal refers to a control signal that is transmitted to a receiver node by a transmitter node that relays the data packet. The CTS signal refers to a control signal that is transmitted to the transmitter node by the receiver node that receives the relayed data packet.

In response to the RTS signal and the CTS signal being exchanged, the data packet may be transmitted from the transmitter node to the receiver node. After the transmission of the data packet has completed, the receiver node may send an acknowledgement (Ack) signal to the transmitter node indicating that the data packet was received. For example, node $R_i$ may transmit an RTS signal to node $R_{i+1}$, to indicate that the data packet received from a node $R_{i-1}$ may be transmitted to the node $R_{i+1}$.

If a data packet associated with the RTS signal is determined to be routable from the packet routing apparatus 100 to nodes that are along a routing path of the data packet, the packet routing apparatus 100 may transmit a CTS signal in response to the RTS signal to node using an address for the packet routing apparatus 100, while sniffing the RTS signal.

In this example, node $R_i$ may perform authentication to determine whether the packet routing apparatus 100 has authority to participate in packet relaying. For example, the authentication may include a key exchange and the like, and the node $R_i$ may transmit the data packet to the packet routing apparatus 100.

In response to the data packet being received, the packet routing apparatus 100 may route the data packet to one of "n-i" nodes that include nodes $R_{i+1}$ and $R_n$, for example, to the node $R_k$. The packet routing apparatus 100 may route the data packet based on a routing table that is stored in the packet routing apparatus 100.

Accordingly, at least one node that is scheduled to relay the data packet on an existing routing path may be excluded from the relaying of the data packet.

For example, the packet routing apparatus 100 may snatch an RTS signal transmitted by node $R_i$ to node $R_{i+1}$. The packet routing apparatus 100 may determine that the packet routing apparatus 100 is capable of routing a data packet along a relay path such that one or more of the nodes on the relay path can be skipped. The packet routing apparatus 100 may send a CTS signal to node $R_i$ in response.

In this example, the packet routing apparatus 100 may receive the data packet from node $R_i$ and may transmit the data packet to, for example, node $R_{i+2}$, node $R_k$, node $R_n$, and the like. Accordingly, the packet routing apparatus 100 may expedite the transmission of the data packet from a source node to a destination node.

As another example, if a data transfer rate is not high, for example, due to a relatively small data packet to be transmitted, data may be relayed directly without exchanging an RTS signal and a CTS signal, because it is difficult to ignore an overhead due to a control signal, such as an RTS signal, a CTS signal, and the like.

For example, if node $R_i$ transmits a data packet to the node $R_{i+1}$ directly without exchanging an RTS signal and a CTS signal, the packet routing apparatus 100 may sniff the data packet, and may relay the sniffed data packet to a subsequent node such as node $R_{i+2}$ or node $R_k$. In this example, the packet routing apparatus 100 may control node $R_{i+1}$ to not relay the data packet to node $R_{i+2}$. The packet routing apparatus 100 may transmit a relay permission request to the node $R_{i+1}$ requesting an approval for relaying the data packet.

Node $R_{i+1}$ may transmit a relay approval to the packet routing apparatus 100 in response. For example, node $R_{i+1}$ may transmit a relay approval after a predetermined authentication operation is performed with the packet routing apparatus 100. The packet routing apparatus 100 may relay the data packet to one of the subsequent nodes including the nodes $R_{i+2}$ and $R_n$, for example, to the node $R_k$.

In various aspects, the packet routing apparatus 100 may skip at least one relay node that is scheduled to relay the data packet on an existing routing path.

Hereinafter, the packet routing apparatus 100 is further described with reference to FIG. 2

Figure 2:
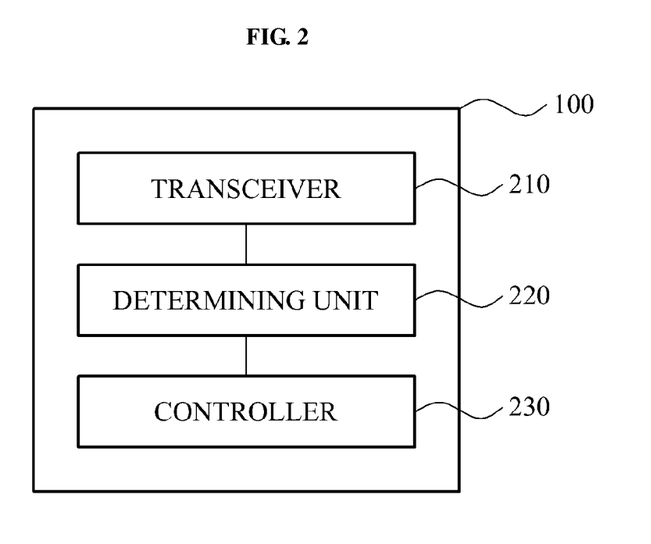
FIG. 2 is a diagram illustrating an example of a packet routing apparatus.

FIG. 2 illustrates an example of a packet routing apparatus.

Referring to FIG. 2, packet routing apparatus 100 includes a transceiver 210, a determining unit 220, and a controller 230.

The transceiver 210 may snatch or sniff a signal such as an RTS signal and/or a data packet that are transmitted by a first node to a second node that are along a relay path between a source node and a destination node. The transceiver 210 may transmit a transmission signal such as a CTS signal to the first node. For example, the transceiver 210 may operate under a control of the controller 230. Additionally, the transceiver 210 may transmit the data packet to a node that is further along the relay path thereby skipping one or more relay nodes along the relay path.

The determining unit 220 may set and/or reset a routing path for participation in the sensor network 101 of FIG. 1, while the packet routing apparatus 100 participates in the sensor network 101. For example, the determining unit 220 may determine whether the packet routing apparatus 100 has a routing path for enabling relaying of a data packet such that one or more of the relay nodes may be skipped. For example, the determining unit may determine the routing path based on a routing table according to the setting and resetting of the routing path.

The controller 230 may control the transceiver 210 and the determining unit 220 to perform sniffing, snatching, and/or relaying of an RTS signal and a data packet, respectively.

An operation of the controller 230 is further described with reference to FIG. 3.

Figure 3:
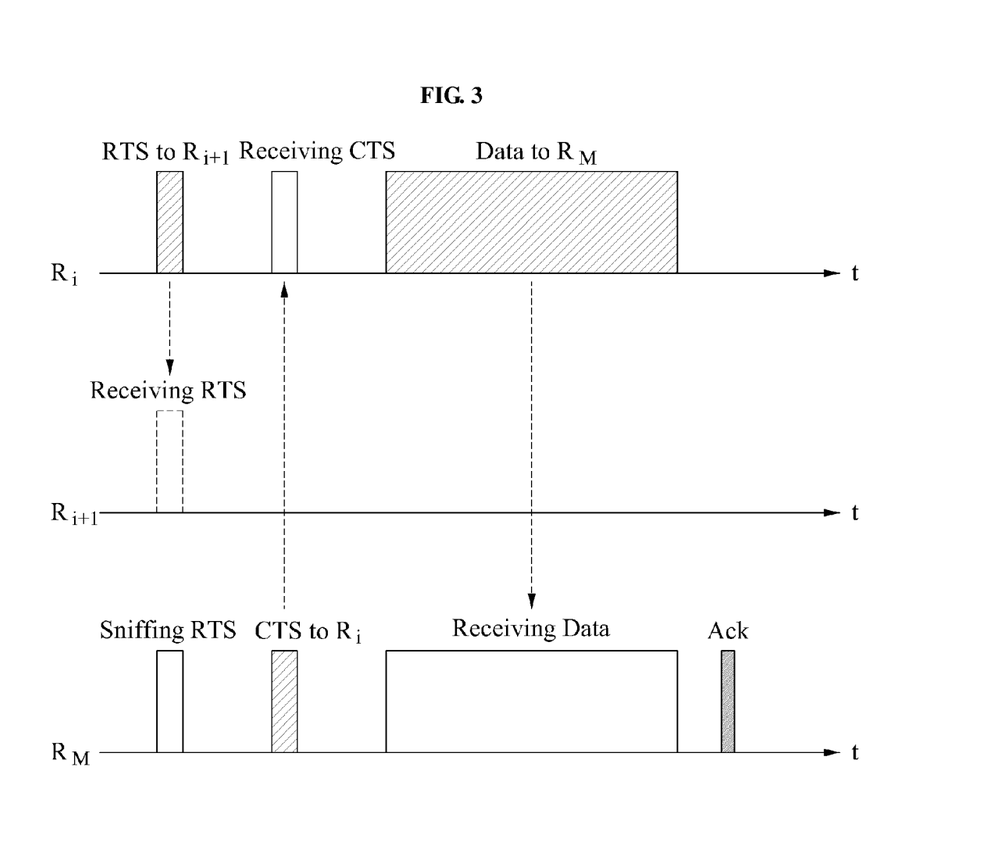
FIG. 3 is a diagram illustrating an example in which a packet routing apparatus snatches a data packet between nodes in a sensor network.

FIG. 3 illustrates an example in which the packet routing apparatus snatches a data packet between nodes in a sensor network.

Referring to FIGS. 1-3, nodes in the sensor network 101 may transmit or receive an RTS signal and a CTS signal, in order to relay the data packet. In this example, the packet routing apparatus 100 may be referred to as a node $R_M$.

Node $R_i$ may transmit an RTS signal to the node $R_{i+1}$, to relay the data packet to the node $R_{i+1}$. In this example, if node $R_{i+1}$ is in the sleep state, node $R_M$ may sniff the RTS signal and may receive the sniffed RTS signal, instead of the RTS signal being received by node $R_{i+i}$.

If node $R_M$ has a routing path for enabling relaying of a data packet corresponding to the RTS signal that is capable of skipping one or more of the nodes on the relay path, the controller 230 may generate a CTS signal based on an address for the node $R_M$ and may control th transceiver 210 to transmit the CTS signal to the node $R_i$.

In response to receiving the CTS signal, the node $R_i$ may transmit the data packet to the node $R_M$. In this example, the node may wait to transmit the data packet until after a predetermined authentication operation is performed with the packet routing apparatus 100.

In response to receiving the data packet, the node $R_M$ may send an Ack signal to the node and may relay the data packet to a node having a connection to the node $R_M$ from among "n–i" nodes that are located between the nodes $R_{i+1}$ and $R_n$. For example, the node $R_k$ may be selected as a node that has a connection to the node $R_M$ and that is located closest to the node $R_n$, from among the "n–i" nodes.

Accordingly, at least one node between the nodes $R_{i+1}$ and $R_k$ may be excluded from the relaying of the data packet. As a result, it is possible to prevent power consumption, and to increase a QoS by reducing a transmission path. Additionally, a transmission delay may be reduced. In this example, the packet routing apparatus 100 may have very short wakeup intervals, or may be in the active state at all times. Therefore, the delay caused by waiting for a relay node to wake up can be prevented because the packet routing apparatus 100 may be in an active state at all times.

For example, if node $R_i$ transmits an RTS signal to node $R_{i+1}$, and node $R_{i+1}$ is in the active state, not in the sleep state, the RTS signal may be received by the node $R_{i+1}$, as well as by the node $R_M$. Accordingly, node $R_{i+1}$ may transmit a CTS signal in response to the RTS signal, to node $R_i$.

The CTS signal transmitted by the node $R_{i+1}$ to the node $R_i$ may collide with the CTS signal transmitted by the node $R_M$ to the node $R_i$. For example, both the CTS signal transmitted by node $R_m$ and the CTS signal transmitted by node $R_{i+1}$ may be received by node $R_i$. In this example, node $R_i$ may select either the node $R_{i+1}$ or the node $R_M$. For example, node $R_i$ may select a node based on a predetermined policy, and may transmit the data packet to the selected node.

The predetermined policy may include, for example, an interface spacing scheme proposed by an Institute of Electrical and Electronics Engineers (IEEE) 802.11, a scheme of randomly setting a backoff, a scheme of setting a backoff based on a priority, and the like.

Additionally, node $R_M$ sniffing the RTS signal may obtain a relay approval directly from the node $R_{i+1}$, and may exclude the node $R_{i+1}$ from the relaying.

As described above, because node $R_M$ intervenes in the relaying, node $R_{i+1}$ may not receive the data packet. Before node $R_{i+1}$ receives the data packet, the node $R_M$ may relay the data packet by snatching the data packet. The example of FIG. 3 may be represented as "relay by snatching data packet".

Figure 4:
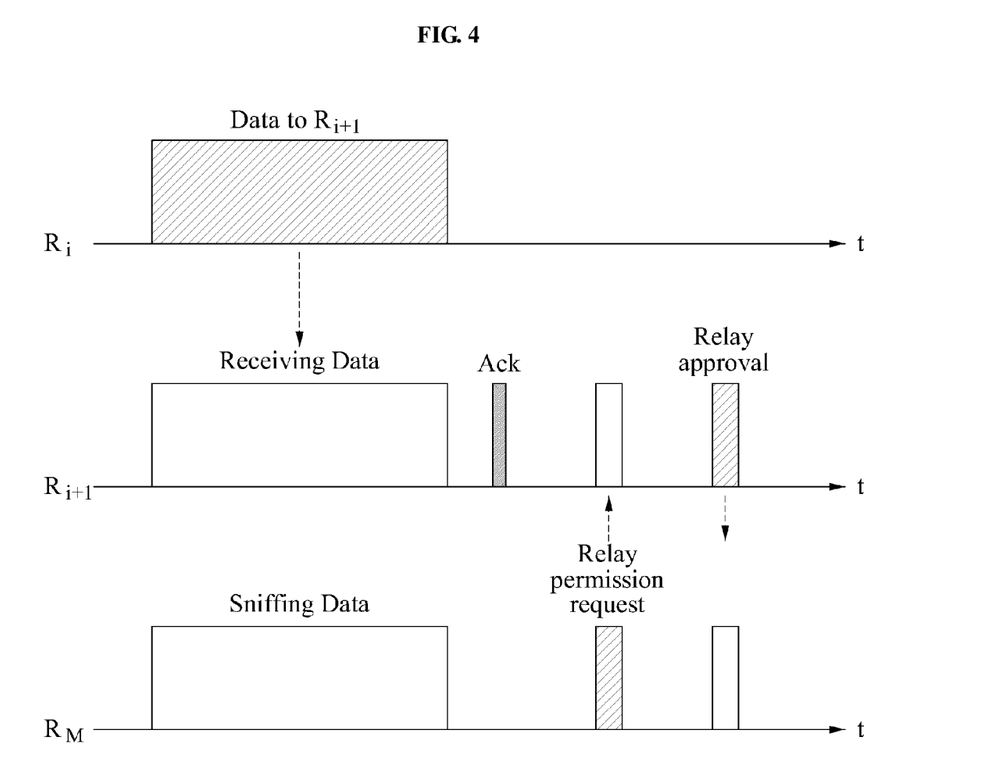
FIG. 4 is a diagram illustrating an example in which a packet routing apparatus sniffs a data packet between nodes in a sensor network and receives a relay approval.

FIG. 4 illustrates an example in which a packet routing apparatus sniffs a data packet between nodes in a sensor network and receives a relay approval.

In this example, the data packet may be relayed directly without exchanging an RTS signal and a CTS signal.

The data packet may be transmitted from node $R_i$ directly to node $R_{i+1}$, and accordingly node $R_M$ may intervene in the relaying by sniffing the data packet, instead of snatching the data packet.

Node $R_M$ may control node $R_{i+1}$ not to relay the data packet to node $R_{i+2}$ that is the subsequent node on the relay path. Accordingly, node $R_M$ may transmit, to node $R_{i+1}$, a relay permission request to request an approval for relaying the data packet.

In response to the relay permission request, node $R_{i+1}$ may transmit a relay approval to the node $R_M$. In this example, before transmitting the relay approval, the node may perform a predetermined authentication operation with the packet routing apparatus $R_m$.

In response to the relay approval, node $R_M$ may perform other relaying operations.

The controller 230 may control the transceiver 210 to relay the data packet to a node that has a connection to node $R_M$ from among "n–i–1" nodes that are located on a routing path between the nodes $R_{i+2}$ and $R_n$, based on a routing path determination of the determining unit 220. For example, the data packet may be relayed to node $R_k$.

Node $R_k$ may be selected as a node that has a connection to the node $R_M$ and that is located closest to the node $R_n$, from among the "n–i–1" nodes.

Accordingly, at least one node between the nodes $R_{i+2}$ and $R_k$ may be excluded from the relaying of the data packet. As a result, it is possible to prevent power consumption, and to increase a QoS by reducing a transmission path.

Additionally, as described above, a packet routing apparatus such as a mobile terminal may have an advantage that a transmission delay for relay is reduced, because the mobile terminal may have very short wakeup intervals, or may be in the active state at all times.

In the example of FIG. 4, node $R_{i+1}$ already received the data packet, and the node $R_M$ intervenes in the relaying of the data packet by receiving the data packet through the sniffing. The example of FIG. 4 may be represented as "relay sniffed data packet".

Figure 5:
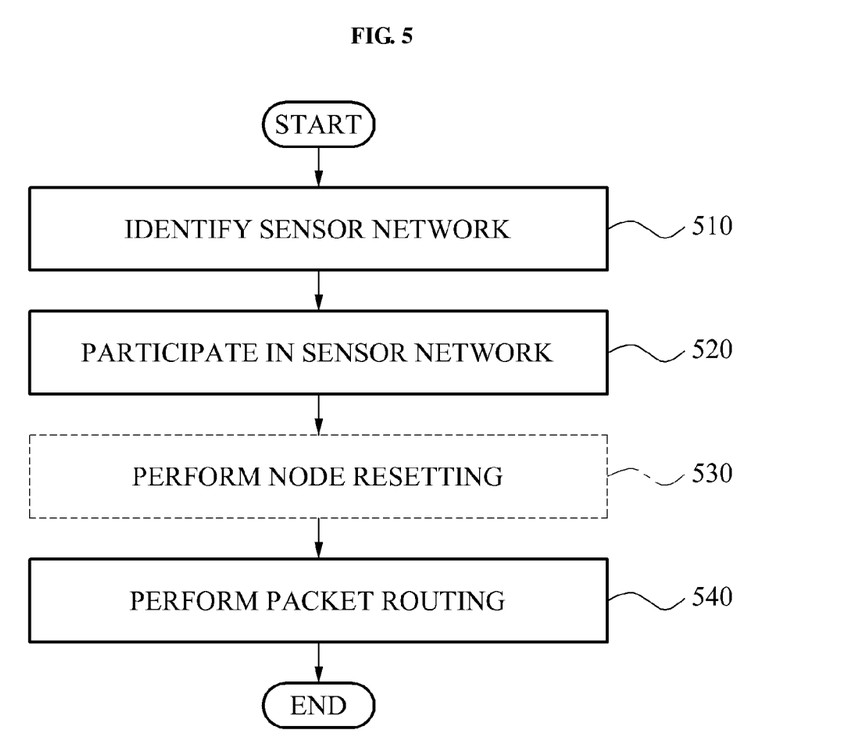
FIG. 5 is a flowchart illustrating an example of a packet routing method.

FIG. 5 illustrates an example of a packet routing method.

Referring to FIGS. 1-5, as the packet routing apparatus 100 accesses the sensor network 101, the sensor network 101 is detected by the transceiver 210, and is identified by the determining unit 220, in 510.

In 520, under the control of the controller 230, the packet routing apparatus 100 participates in the sensor network 101. For example, the packet routing apparatus 100 may set a routing path in the sensor network 101, so that a routing table may be generated.

In 530, the determining unit 220 determines whether the packet routing apparatus 100 is able to participate in the sensor network 101, based on one or more factors, for example, a mobility pattern of the packet routing apparatus 100, an intensity of a signal, a network frequency, and the like.

If it is determined that the packet routing apparatus 100 is to participate in the sensor network 101 for a predetermined period of time or longer, the packet routing apparatus 100 may selectively perform node resetting to newly set an overall network topology.

In 540, the packet routing apparatus 100 performs packet routing, based on the "relay by snatching data packet" of FIG. 3, and/or the "relay sniffed data packet" of FIG. 4.

Figure 6:
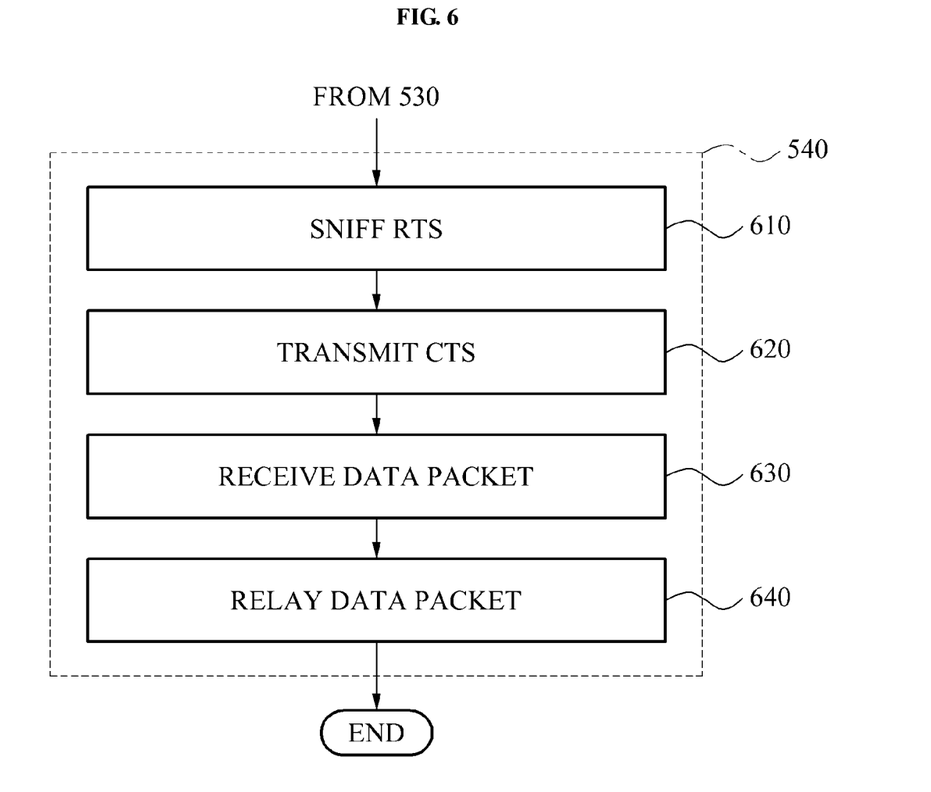
FIG. 6 is a flowchart illustrating an example of a method in which a packet routing apparatus snatches a data packet between nodes in the sensor network.

FIG. 6 illustrates an example of a method in which a packet routing apparatus snatches a data packet between nodes in a sensor network.

In the example of the "relay by snatching data packet" of FIG. 3, operation 540 of FIG. 5 for packet routing may include operations as below.

In 610, node $R_M$ sniffs an RTS signal that is transmitted by node $R_i$ to node $R_{i+1}$ to relay the data packet to the node $R_{i+1}$.

In this example, node $R_M$ has a routing path for enabling relaying of a data packet corresponding to the RTS signal, based on a routing path determination of the determining unit 220. Accordingly, in 620 the controller 230 generates a CTS signal based on an address for the node $R_M$ and controls the transceiver 210 to transmit the CTS signal to node $R_i$.

In 630, node $R_i$ receives the CTS signal, and transmits the data packet to node $R_M$ after a predetermined authentication operation. The node $R_M$ receives the data packet from node $R_i$ In 640, in response to the data packet being received, node $R_m$ relays the data packet to a node having a connection to the node $R_M$ from among "n–i" nodes that are located between the node $R_{i+1}$ and $R_n$, based on a routing table in the node $R_M$. For example, the data packet may be relayed to node $R_k$.

Operations 610 to 640 are the same as those described with reference to FIGS. 2 and 3.

Figure 7:
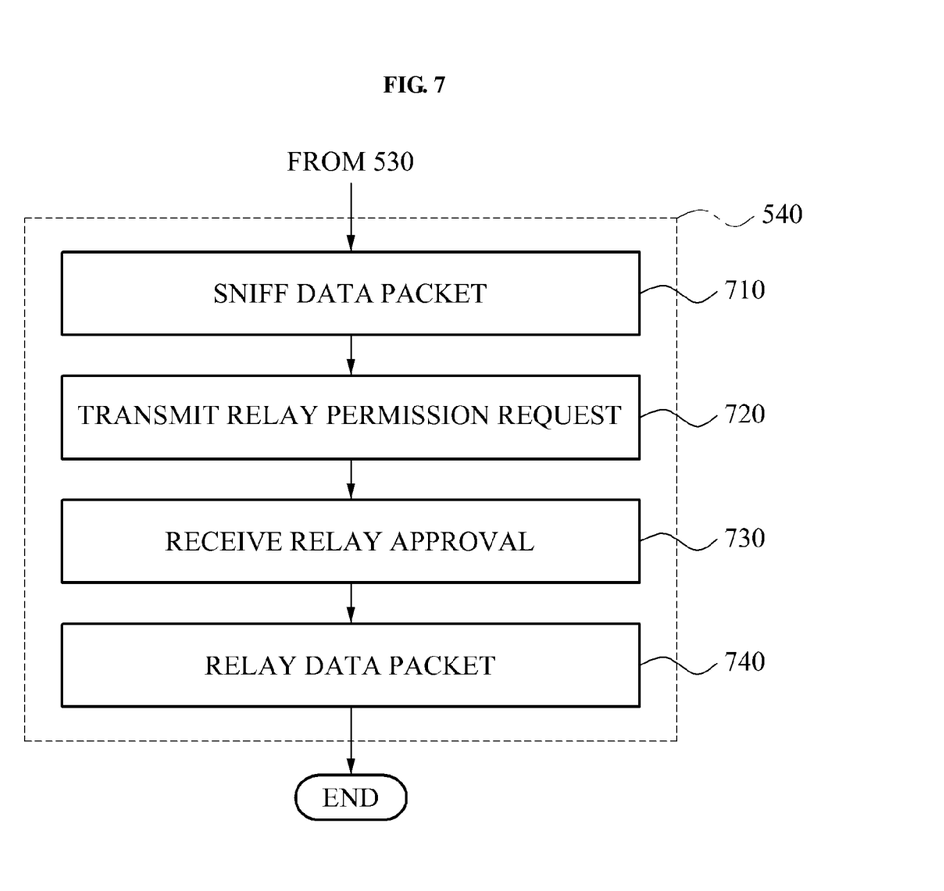
FIG. 7 is a flowchart illustrating an example of a method in which a packet routing apparatus sniffs a data packet between nodes in a sensor network and receives a relay approval.

FIG. 7 illustrates an example in which a packet routing apparatus sniffs a data packet between nodes in a sensor network and receives a relay approval.

In the example of the "relay sniffed data packet" of FIG. 4, operations 540 for packet routing may include operations as below.

For example, a data packet may be transmitted directly without exchanging an RTS signal and CTS signal between the nodes $R_i$ and $R_{i+1}$ in the sensor network 101. In various aspects herein, node $R_M$ intervenes in the relaying by sniffing the data packet, in 710, instead of snatching the data packet before the data packet is transmitted.

In 720, node $R_M$ transmits, to node $R_{i+1}$, a relay permission request to request an approval for relaying the data packet, so that node $R_{i+1}$ does not relay the received data packet to the subsequent node on the relay path, node $R_{i+2}$.

In 730, node $R_M$ receives a relay approval from the node $R_{i+1}$. In this example, the node $R_{i+1}$ may transmit the relay approval after a predetermined authentication operation.

In 740, node $R_M$ relays the data packet to a node that has a connection to the node $R_M$ from among "n–i–1" nodes that are located between the node $R_{i+2}$ and $R_n$. For example, the data packet may be relayed to the node $R_k$.

Operations 710 to 740 are the same as those described with reference to FIGS. 2 and 4.

In various aspects, the packet routing apparatus may snatch a request to send (RTS) signal that is transmitted from a first node to a second node in the sensor network and may intervene on the relay path of the snatched data packet.

In various aspects, the packet routing apparatus may sniff a data packet that is transmitted from a first node to a second node and may intervene on the relay path of the sniffed data packet.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile node packet routing apparatus that temporarily participates in a network, the apparatus comprising:
a transceiver to receive a request to send (RTS) signal that is transmitted from a first node to a second node included in the network;
a controller to generate a clear to send (CTS) signal that is in response to the received RTS signal, and to control the transceiver to transmit the CTS signal to the first node; and
a determining unit to determine whether the packet routing apparatus is able to stably participate in the network, based on a mobility pattern of the packet routing apparatus, wherein in response to the packet routing apparatus being determined to be able to stably participate in the network for a predetermined period of time, the controller performs network path resetting so that the packet routing apparatus is included in the network.

2. The packet routing apparatus of claim 1, further comprising:
a determining unit to determine whether a data packet associated with the received RTS signal is routable from the packet routing apparatus to a destination node of the data packet,
wherein, in response to the data packet being determined to be routable from the packet routing apparatus to the destination node, the controller generates the CTS signal in response to the RTS signal, and controls the transceiver to transmit the CTS signal to the first node.

3. The packet routing apparatus of claim 1, wherein the transceiver receives a data packet that is associated with the RTS signal from the first node, and relays the data packet to a third node included in the network.

4. The packet routing apparatus of claim 1, wherein the network is a multi-hop sensor network, and the second node is a relay node to receive data of the first node and to relay the received data.

5. A packet routing method executed by a mobile node that temporarily participates in a network, the method comprising:
receiving a request to send (RTS) signal that is transmitted from a first node to a second node included in the network;
determining whether a data packet associated with the received RTS signal is routable from a packet routing apparatus to a destination node of the data packet;
generating a clear to send (CTS) signal in response to the RTS signal, in response to determining the data packet is routable from the packet routing apparatus to the destination node;
transmitting the CTS signal to the first node;
determining whether the mobile node is able to stably participate in the network, based on a mobility pattern of the mobile node; and
performing network path resetting so that the mobile node is included in the network, in response to determining that the mobile node is able to stably participate in the network for a predetermined period of time.

6. The packet routing method of claim 5, further comprising:
receiving the data packet from the first node; and
relaying the data packet to a third node included in the network.

7. The packet routing method of claim 5, wherein the network is a multi-hop sensor network, and the second node is a relay node to receive data of the first node in the network and to relay the received data.

8. A non-transitory computer-readable storage medium storing program instructions to cause a processor to implement a method executed by a mobile node that temporarily participates in a network, the method comprising:
receiving a request to send (RTS) signal that is transmitted from a first node to a second node included in the network;
determining whether a data packet associated with the received RTS signal is routable from a packet routing apparatus to a destination node of the data packet;
generating a clear to send (CTS) signal in response to the RTS signal, in response to determining the data packet is routable from the packet routing apparatus to the destination node;
transmitting the CTS signal to the first node;
determining whether the mobile node is able to stably participate in the network, based on a mobility pattern of the mobile node; and
performing network path resetting so that the mobile node is included in the network, in response to determining that the mobile node is able to stably participate in the network for a predetermined period of time.

* * * * *